United States Patent
Kessler et al.

(12)

(10) Patent No.: US 6,859,000 B2
(45) Date of Patent: Feb. 22, 2005

(54) DEVICE FOR POSITION DETERMINATION IN SENSORLESS MOTORS

(75) Inventors: Martin Kessler, Tiefenbronn (DE); Ulrich Frank, Ottersweier (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/915,426

(22) Filed: Jul. 26, 2001

(65) Prior Publication Data

US 2002/0085838 A1 Jul. 4, 2002

(30) Foreign Application Priority Data

Jul. 26, 2000 (DE) .......................................... 100 36 413

(51) Int. Cl.$^7$ ................................................ H02P 1/18
(52) U.S. Cl. ...................... 318/254; 318/138; 318/439; 318/459; 318/500; 388/923; 388/928.1
(58) Field of Search ................................. 318/254, 138, 318/439, 459, 500, 720, 721, 724; 388/923, 928.1, 816, 819, 822

(56) References Cited

U.S. PATENT DOCUMENTS

| 4,978,895 A | * | 12/1990 | Schwarz ...................... 318/254 |
| 5,130,620 A | * | 7/1992 | Inaji et al. .................... 318/254 |
| 5,640,073 A | * | 6/1997 | Ikeda et al. .................. 318/439 |
| 5,783,917 A | * | 7/1998 | Takekawa .................... 318/439 |
| 5,818,179 A | * | 10/1998 | Kokami et al. ............. 318/254 |
| 5,982,133 A | * | 11/1999 | Murakami et al. .......... 318/650 |

* cited by examiner

Primary Examiner—Rina Duda
(74) Attorney, Agent, or Firm—Michael J. Striker

(57) ABSTRACT

A device for position determination in a sensorless direct current motor has a plurality of inductivities arranged in corresponding phases and inducing alternating voltages in a motor windings, a plurality of resistances located in phase branches to be evaluated for a position determination of a rotor position of the sensorless direct current motor, and a plurality of comparator components each associated with the corresponding phase branch to be evaluated.

3 Claims, 2 Drawing Sheets

DEVICE FOR POSITION DETERMINATION IN SENSORLESS MOTORS

BACKGROUND OF THE INVENTION

The present invention relates to a device for position determination in sensorless motors.

In electrical machines such as electric motors, for example brushless direct current motors, which have no additional sensors for position determination of the rotor, the counter voltage $U_{EMF}$ of the motor winding by the electric motor force (EMF) is evaluated. The actual position of the rotor of the brushless direct current motor can be determined via the zero crossing of the alternating voltage $U_{EMF}$. In brushless direct current motors with several phases, the induced counter voltages of several phases are evaluated for position determination of the rotor.

Brushless direct current motors as a rule are provided with several phases, in which the corresponding induced counter voltages can be utilized for position determination of the actual rotary position of the rotor of the electric motor. For this purpose a demultiplexer is utilized, with which the phase which is to be selected with respect to its induced counter voltage, is selected. By means of a comparator, its corresponding zero crossing is subsequently detected.

In order to match the corresponding induced countervoltage of the selected phase to the input direct phase region of the comparator, a voltage divider is utilized. Each used voltage divider has the same division ratio. In addition to the use of voltage dividers with identical division ratios, it has been found that it is possible to replace the demultiplexers with bipolar transistors in the series branch. By means of a corresponding series pass transistor, the corresponding selective phase is connected with the comparator. Since at the series pass transistors of each phase a no more negligible voltage drops, for compensation at the reference branch at the bipolar transistors provided there also a voltage drop is produced. The disadvantage of this solution is the condition that the component element tolerances and temperature influences can drive the produced voltage drop so far from one another that the phase displacement which results from it can have influence on the power and the efficiency of the brushless direct current motors.

Moreover, the solution with the use of series pass transistors in the series branches has the disadvantage that the series pass transistors provided there have parasitic capacities. In the case of a cycled control of the end stage transistors, also the corresponding blocked transistor, through this capacities voltage peaks are coupled from the phase to the comparator input. Thereby the interference voltage difference at the comparator is significantly reduced, and at low rotary speeds of the brushless direct current motor the induced countervoltage goes down into the interference spectrum and no evaluation of the input voltage signals at the comparator is possible.

Instead of bipolar transistors which can be incorporated both in the reference branch and also in each phase, also MOS field effect transistors can be utilized. With the use of the field effect transistors, for the purpose of selecting the corresponding phase to be evaluated, the voltage drop through the field effect transistor can be negligible. This however is connected with the disadvantage that the field effect transistors when compared with the effect of bipolar transistors have substantially greater parasitic capacities. The greater the parasitic capacities, the lower the interference voltage difference at the input size of the comparator. Thereby with the use of the field effect transistors in the evaluating circuit, no rotary speeds of the brushes direct current motors are no longer detected in the occurring interference spectrum, and thereby the problems which are contributed to the use of bipolar transistors in this connection are amplified.

A further solution for determination of the actual position of the rotor for a sensorless, brushless direct current motors is to implement in the phases to be selected an OR-logic with diodes. Transistors which are connected through diodes blend all not selected phases, so that one phase can be pieced at the input side of the comparator. Thereby the skipping of voltage peaks of one phase via parasitic capacities is minimized, as can occur with the use of bipolar transistors or also field effect transistors in the remaining variants. The disadvantage of the use of diodes is the condition that the voltage drops in the corresponding longitudinal paths to be evaluated can be higher than the respective voltage drop or the spaced voltage drops via component tolerances and temperature than with the use of bipolar transistors in the evaluating circuit.

SUMMARY OF THE INVENTION

It is therefore an object of the present invention to provide a new device for position determination in sensorless motors, which avoids the disadvantages of the prior art.

In accordance with the present invention the combination of demultiplexers and the multiplexers and comparators, in addition to the provided edge conditions of the costs and piece minimization can cover the following requirements. Each phase to be evaluated in a brushless direct current motor is provided with resistors for securing against voltage peaks on the one hand, on the other hand in each phase to be evaluated in the brushless direct current motor a transistor element is received. By means of the transistor elements which can be formed as bipolar transistors or field effect transistors, it is possible for the not selected time, or in other words during the time period in which the corresponding phase is not directly evaluated from position recognition of the position of the rotor, voltage peaks can be removed in such a way that in each phase the transistors are is connected to a reference potential. Thereby it is guaranteed that the occurring voltage peaks or interferences in the directly not evaluated phases pass in the moment into the phase used in the evaluation and affect the evaluation results.

Each phase of a brushless direct current motor is provided with a comparator component. The OR-connection is performed first after the comparison of the corresponding phase voltage with the comparison voltage. Thereby in advantageous manner components in the series path are dispensed with, so that in the series path no voltage drop is produced. This also provides the advantage that also a voltage drop in the reference branch used for the comparison can be dispensed. This allows a substantially most cost favorable design of the evaluation circuit.

A further advantage of the inventive device for position determination of the rotor in a brushless, sensorless direct current motor is that in the inventive device a higher interference difference is realized. Also, with the inventive device lower voltages per each phase can be reliably evaluated so that a protective connection for overvoltage limit, such as for example required in the diode solution, can be completely dispensed with. This provides on the one hand a simplified circuitry, and on the other hand saves corresponding electronic components.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
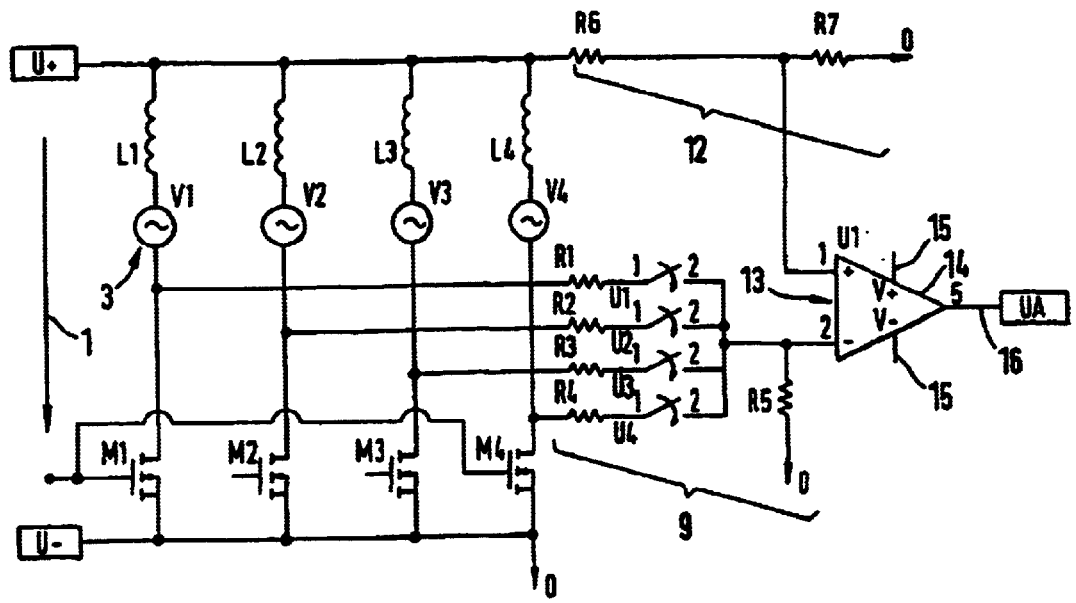
FIG. 1 is a view showing a principle diagram for a sensorless position determination with induced countervoltages of a corresponding voltage divider, which together are connected to an input of a comparator element.

FIG. 1 shows a demultiplexer/comparator combination. It is set at each phase to be evaluated in a brushless direct current motor. Reference numeral 1 identifies the polarity of a voltage source. Inductivities 2 are provided with each phase to be evaluated, for example in a brushless direct current motor. They induce alternating counter voltages 3. The zero or zero crossover of the alternating voltages 3 allows for position determination to evaluate the position of the rotor in a brushless, sensorless direct current motor. As can be seen from FIG. 1, the resistors 4, 5, 6, 7 each with the resistor 8 form a first voltage divider 9, and the resistor 10 with the resistor 11 represent a second voltage divider 12. The both voltage dividers 9 and 12 have the same divider ratio, to adapt the induced counter voltages 3 in the phases of the sensorless, brushless current motor to be evaluated to the input direct cycle region of the comparator component 14. Reference numeral 15 at the comparator component 14 identifies the corresponding control voltage pulses to be applied, while reference numeral 13 identify the input side with the input 1 and 2 of the comparator component 14. At the output voltage $U_A$ is taken at the output side of the comparator element 14 as shown in FIG. 1.

Figure 2:
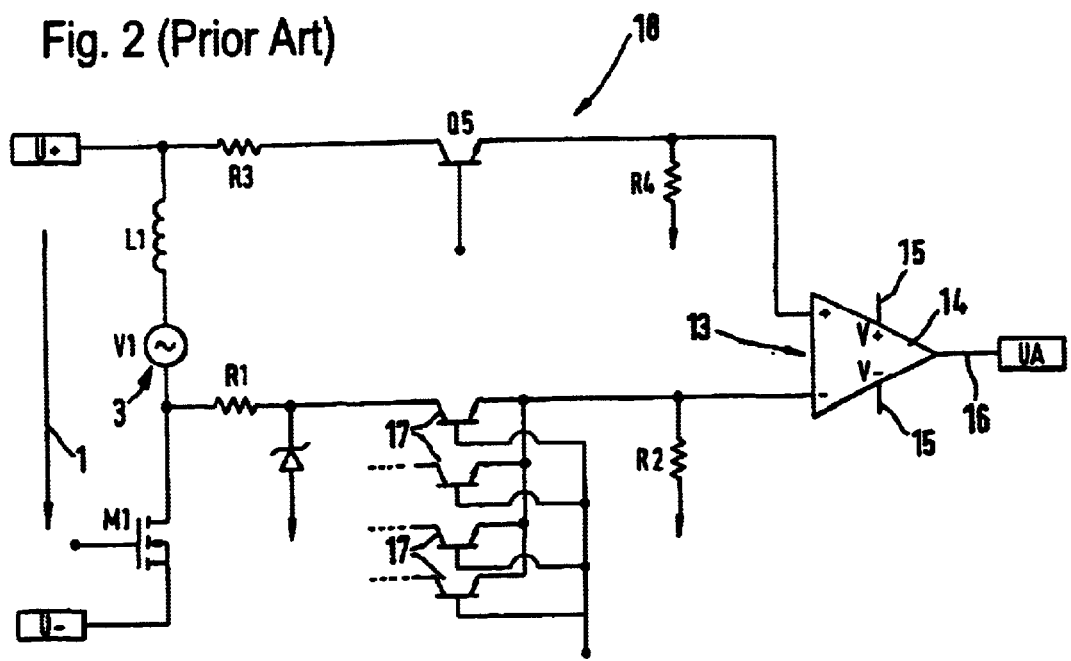
FIG. 2 is a view showing a demultiplex circuit with series pass transistors arranged in the corresponding phases to be evaluated, and also connected together to the input of the comparator element.

FIG. 2 shows a demultiplexer with series pass transistors provided in the corresponding phase branches.

Reference numeral 1 again identifies the voltage source. In FIG. 2 one phase to be evaluated is illustrated completely, while the other phases to be evaluated are shown only schematically. Also, in this configuration from the prior art, all phases are connected to a comparator component 14 which is common for all phases. The output voltage $U_A$ can be taken at its output side as identified with reference numeral 16. Each phase to be evaluated is connected by a series pass transistor 17 selectively and with the input side 13 of the comparator component 14. A not negligible voltage drops in each corresponding phase branch at the series pass transistor 17, so that a voltage drop is produced for its compensation in the reference branch 18 by a series pass transistor component provided in it. The solution shown in FIG. 2 has a disadvantage that a component tolerances and temperature influences can drive the produced voltage drop in each branch to be evaluated as well as in the reference branch so far from one another, that the phase displacement resulting from it can have a significant influence on the power and the efficiency on the brushless, sensorless direct current motor. Furthermore, the parasitic capacities of the transistors 17 are not too negligible. In the case of a cycled control of end stage transistors 19 (see FIG. 1), with blocked transistor components 17 or 19, through these capacities voltage peaks from the phase can reach the input side 13 of the comparator component 13. The produced effect is a reduction of the interference voltage difference. Thereby with small rotary speeds the induced counter voltages 3 go into an interference spectrum and an accurate position determination at the rotor of the brushless, sensorless direct current machine is no longer possible.

Figure 3:
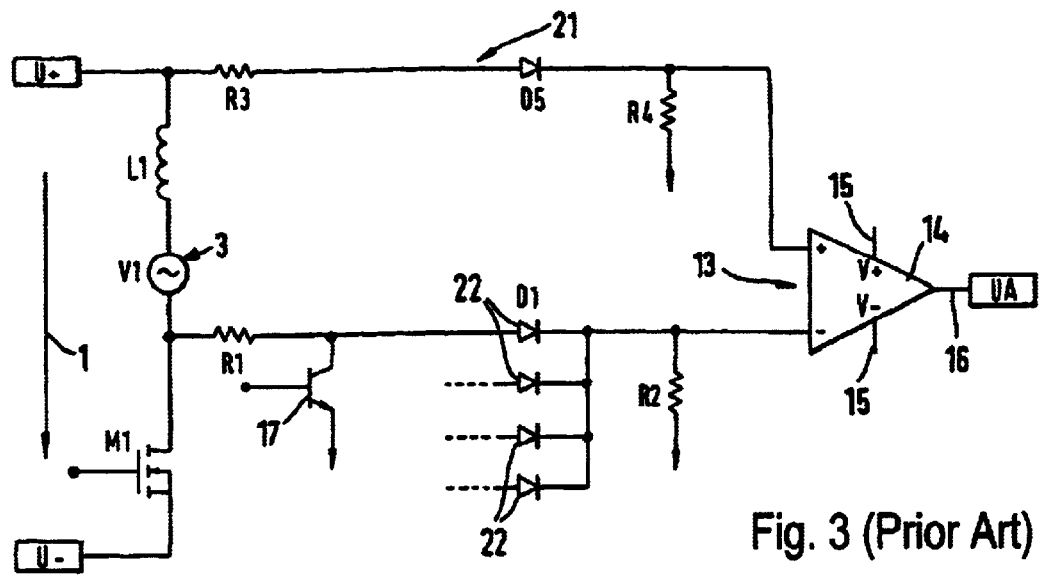
FIG. 3 is a view showing a demultiplexer with diodes arranged in a reference branch as well as in the corresponding phase strands to be evaluated, which are connected together to the input of the comparator component.

FIG. 3 shows a demultiplexer arrangement with diodes both in the reference branch as well as in each phase of the brushless, sensorless direct current motor to be evaluated.

In this arrangement also from the prior art all diodes and the phase branches to be evaluated are connected together to input side of a comparator component 14. At the output side, the output voltage 16 $U_A$ can be taken at the comparator component 14. Diode elements 22 are integrated both in the reference branch 21 and also in phase branches to be evaluated. Moreover, the individual phase branches of the demultiplexer arrangement in accordance with the embodiment of FIG. 3 are connected with $Z_A$ diodes, so that a protective circuit for over voltage limit is provided. In this configuration the produced voltage drops in the series branches are significant. The influences of component tolerances and temperature effects are stronger than in the solution shown in FIG. 2 in which the transistor components 17 are integrated in the corresponding phase branches to be evaluated.

Figure 4:
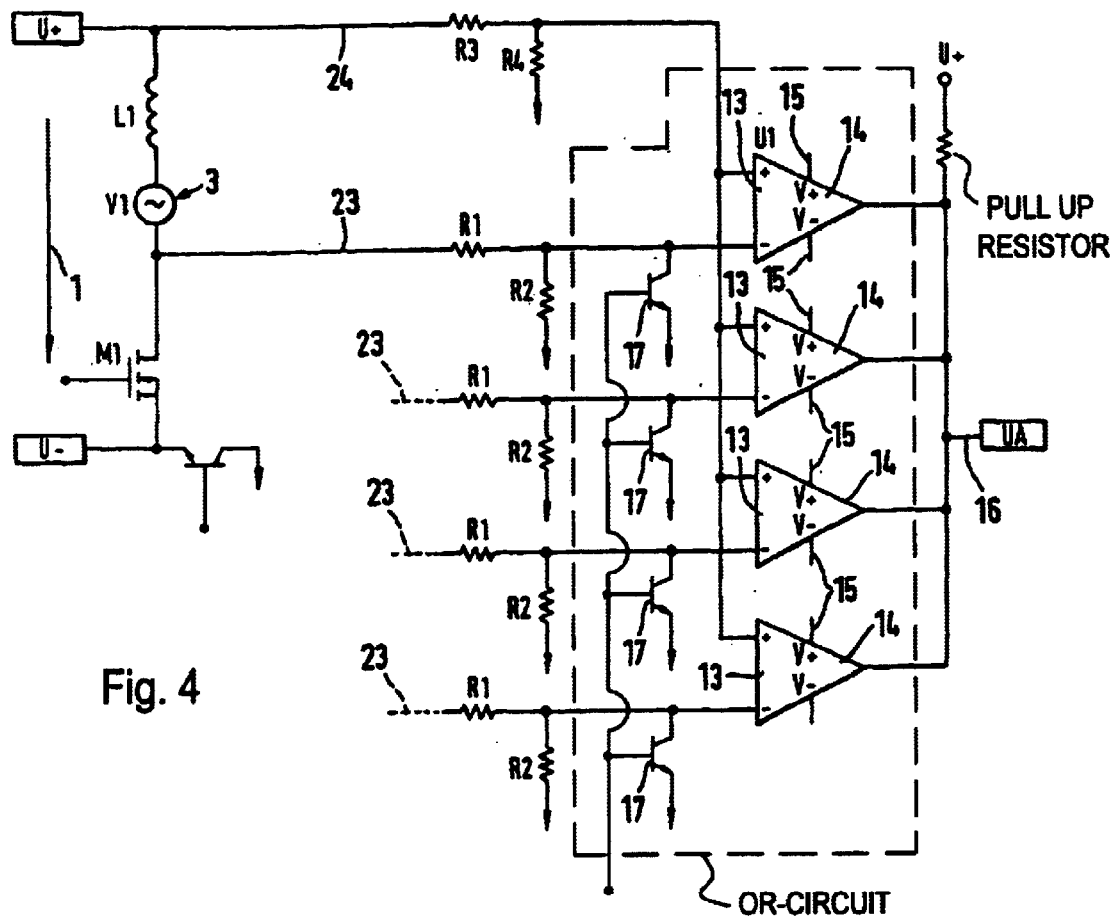
FIG. 4 is a view showing a demultiplexer with a reference branch and four phases to be evaluated as an example, wherein each phase to be evaluated is associated with a separate comparator component.

FIG. 4 shows the configuration proposed in accordance with the present invention. Reference numeral 1 identifies the voltage source whose voltage is supplied to a fully illustrated phase branch 23 of a brushless, sensorless direct current motor. The other phase branches 23 shown here in the example 4 are illustrated only schematically. Alternating voltages 3 are induced by inductivities which are provided in the phase branches 23. Their zero crossings are detected with the inventive device for position determination of the rotor of a direct current motor. In the reference branch 24 two resistors 6 and 7 are integrated, and voltage which acts in the reference branch is applied at the input side of each input of a comparator component 14. The demultiplexer arrangement shown in FIG. 4 is different from those in FIGS. 1, 2 and 3 in that, a separate comparator component 14 is associated with each phase branch 23 to be evaluated in a sensorless, brushless direct current motor. The outputs of the inventive four independent comparator components 14 are connected together to an output 16, at which the output voltage can be taken.

Each phase 23 of a direct current motor to be evaluated contains its own independent comparator component 14, at which control voltage inputs are provided and identified with reference numeral 16. Reference numeral 13 identifies the input side of the comparator component 14. The OR-operation of the voltage values is performed after the comparison of the voltage in the individual phases 23 to be evaluated with the comparison voltage which acts in the reference branch 24. Thereby in an advantageous manner, components in the series branch of the multiplexer are dispensed with, and therefore no additional voltage drops are produced. Since each of the phases 23 to be evaluated contains a translator component 17, a series transistor, or a bipolar transistor which connects then the non-selected time connects the comparator input to the reference potential, the voltage peaks and other interferences do not reach the input side 13 of the component 14 provided in each phase branch 23 to be evaluated. With this solution a very high interference voltage difference is guaranteed, so that the countervoltages 3 induced at small rotary speeds of the brushless, sensorless, direct current motor are located outside of the interference spectrum. Therefore, the zero crossings of the alternating voltages can be reliably detected, and also at small rotary speeds an exact position determination of the rotor of the direct current machine can be provided.

Protective circuits for overvoltage limiting, such as in the example of configuration of the demultiplexer of FIG. 2 designed as a $Z_A$ diode per branch can be completely dispensed with in the inventive demultiplexer arrangement shown in FIG. 4.

With the configuration shown in FIG. 4, in addition to the requirements of minimal costs end a minimal place, compensation requirements such as immunity of the demultiplexer of the comparator-component arrangement from occurring voltage peaks and other interferences during the not selected time can be satisfied as well. The proposed inventive demultiplexer arrangement is immune both with respect to the operation and also the component specification, so that the voltage drops drifting from one another, such as for example in the demultiplexer arrangement of FIG. 2, which can lead to a phase displacement during the operation of the electrical machine are excluded. Furthermore, errors in the phase branches 23 to be evaluated for the voltages 3 due to component tolerances and temperature influences with respect to the amplitude of the produced offset of the phase position, as well as the time course, are excluded. The configuration of demultiplexer which is shown in FIG. 4 and associated with each phase branch 23 with a separate comparator component 14 additionally produces a low zero signal current. Inputs and outputs are provided with low capacities so that together with high-ohmic selected source resistances, no relevant phase displacements can occur.

In the configuration of a demultiplexer arrangement illustrated in FIG. 4, the used transistor components 17 can be either bipolar transistors or field effect transistors, or also series pass transistors. They are located in each of the phase 23 to be evaluated after the resistor pair 4 or 5. At the input side, the comparator components 14 which are controlled through the control voltage input 15 are connected both with the voltage which drops in the reference branch 24, as well as in the corresponding input-side phase branch 23 located at the separate comparator component 14, in the brushless, sensorless direct current motor.

It will be understood that each of the elements described above, or two or more together, may also find a useful application in other types of constructions differing from the types described above.

While the invention has been illustrated and described as embodied in device for position determination in sensorless motors, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A device for position determination in a sensorless direct current motor, comprising a plurality of inductivities arranged in corresponding phases and inducing alternating voltages in a motor winding; a plurality of resistances located in phase branches to be evaluated for a position determination of a rotor position of the sensorless direct current motor; and a plurality of comparator components each associated with the corresponding phase branch to be evaluated, all said comparator elements being connected to a common pull up resistor arranged in a U+-branch, wherein with said transistor elements it can be selected, which of said comparator elements is to be compared to the reference voltage U+, and wherein said phase branches include a non selected phase branch with a transistor element at a reference potential during an evaluation of a phase branch, and each phase branch is provided with a transistor element and one of said resistors which produces a voltage drop.

2. A device as defined in claim 1, wherein said transistor element is selected from the group consisting of a series pass transistor and a field effect transistor.

3. A device as defined in claim 1, wherein all said comparator components are connected at an output side with a common output.

* * * * *